US011263639B2

(12) United States Patent
Kumawat et al.

(10) Patent No.: US 11,263,639 B2
(45) Date of Patent: Mar. 1, 2022

(54) SECURE AND SAFE METHOD TO DISABLING PAYMENT FUNCTIONALITY ON LOST OR STOLEN TRANSACTION CARDS

(71) Applicant: Mastercard International Incorporated, Purchase, NY (US)

(72) Inventors: Jaipal Singh Kumawat, Sikar (IN); Gurpreet Atwal, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 16/777,469

(22) Filed: Jan. 30, 2020

(65) Prior Publication Data
US 2021/0241283 A1 Aug. 5, 2021

(51) Int. Cl.
*G06Q 20/40* (2012.01)
*G06Q 20/20* (2012.01)

(52) U.S. Cl.
CPC ....... *G06Q 20/4093* (2013.01); *G06Q 20/204* (2013.01); *G06Q 20/206* (2013.01); *G06Q 20/4016* (2013.01)

(58) Field of Classification Search
CPC ............ G06Q 20/4093; G06Q 20/204; G06Q 20/206; G06Q 20/4016
See application file for complete search history.

(56) References Cited

U.S. PATENT DOCUMENTS

| 6,988,656 | B2 * | 1/2006 | Scarafile ................ G06Q 20/18 235/379 |
| 9,218,557 | B2 | 12/2015 | Spodak et al. |
| 2012/0047072 | A1 * | 2/2012 | Larkin ............... G06Q 20/3255 705/44 |
| 2013/0175338 | A1 * | 7/2013 | Block ................... G07F 19/205 235/379 |
| 2016/0267486 | A1 | 9/2016 | Mitra et al. |

OTHER PUBLICATIONS

Tidal Commerce "List of Credit Card Declined Codes—Error Codes Explained" Jan. 23, 2018 (Year: 2018).*

* cited by examiner

Primary Examiner — David P Sharvin
(74) Attorney, Agent, or Firm — Hovey Williams LLP

(57) ABSTRACT

The disclosure includes systems and methods for disabling a payment function of a transaction card. The system receives payment account data from a transaction card and transmits a payment authorization request message to a card issuer associated with the transaction card. The system receives, from the card issuer, an authorization request response message. The authorization request response message declines the transaction and includes a status response code corresponding to a status of the transaction card. The system determines whether the status response code indicates that the transaction card is to be captured, and if so, disables the payment function of the transaction card via activation of a disabling system.

13 Claims, 8 Drawing Sheets

SECURE AND SAFE METHOD TO DISABLING PAYMENT FUNCTIONALITY ON LOST OR STOLEN TRANSACTION CARDS

FIELD OF THE DISCLOSURE

The present disclosure relates to systems and methods for disabling the payment function of a transaction card, and in particular, to rendering a transaction card useless for performing payment transactions when a merchant receives a capture card message.

BACKGROUND OF THE DISCLOSURE

Typically, after a cardholder reports a transaction card (e.g., a debit card, credit card, and the like) as being lost or stolen, the issuer of the transaction card will suspend the transaction card in the payment system, thereby preventing the authorization of transactions corresponding to the transaction card. A fraudster may attempt to use the transaction card, for example, to make a purchase or withdraw funds. Generally, the card issuer will transmit an authorization request response message declining the transaction and requesting that the transaction card be captured (e.g., by a merchant, ATM, etc.). Capturing the transaction card can be intimidating or even dangerous for the merchant as the fraudster can pose a threat to the merchant.

SUMMARY OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method for disabling a payment function of a transaction card is provided. The method includes receiving payment account data from a transaction card and transmitting a payment authorization request message to a card issuer associated with the transaction card. The method also includes receiving an authorization request response message from the card issuer. The authorization request response message declines the transaction and includes a status response code corresponding to a status of the transaction card. Furthermore, the method includes determining whether the status response code indicates that the transaction card is to be captured. In addition, the method includes disabling the payment function of the transaction card via activation of a disabling system.

In another aspect, a point-of-sale terminal for disabling a payment function of a transaction card is provided. The system includes a disabling system and a processor coupled to the disabling system. The disabling system includes one or more disabling components configured to disable the payment function of the transaction card. The processor is programmed to receive payment account data from a transaction card and transmit a payment authorization request message to a card issuer associated with the transaction card. The processor is also programmed to receive an authorization request response message from the card issuer. The authorization request response message declines the transaction and includes a status response code corresponding to a status of the transaction card. Furthermore, the processor is programmed to determine whether the status response code indicates that the transaction card is to be captured. And based upon the determination that the transaction card is to be captured, the processor is programmed to disable a payment function of the transaction card using one or more of the disabling components.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
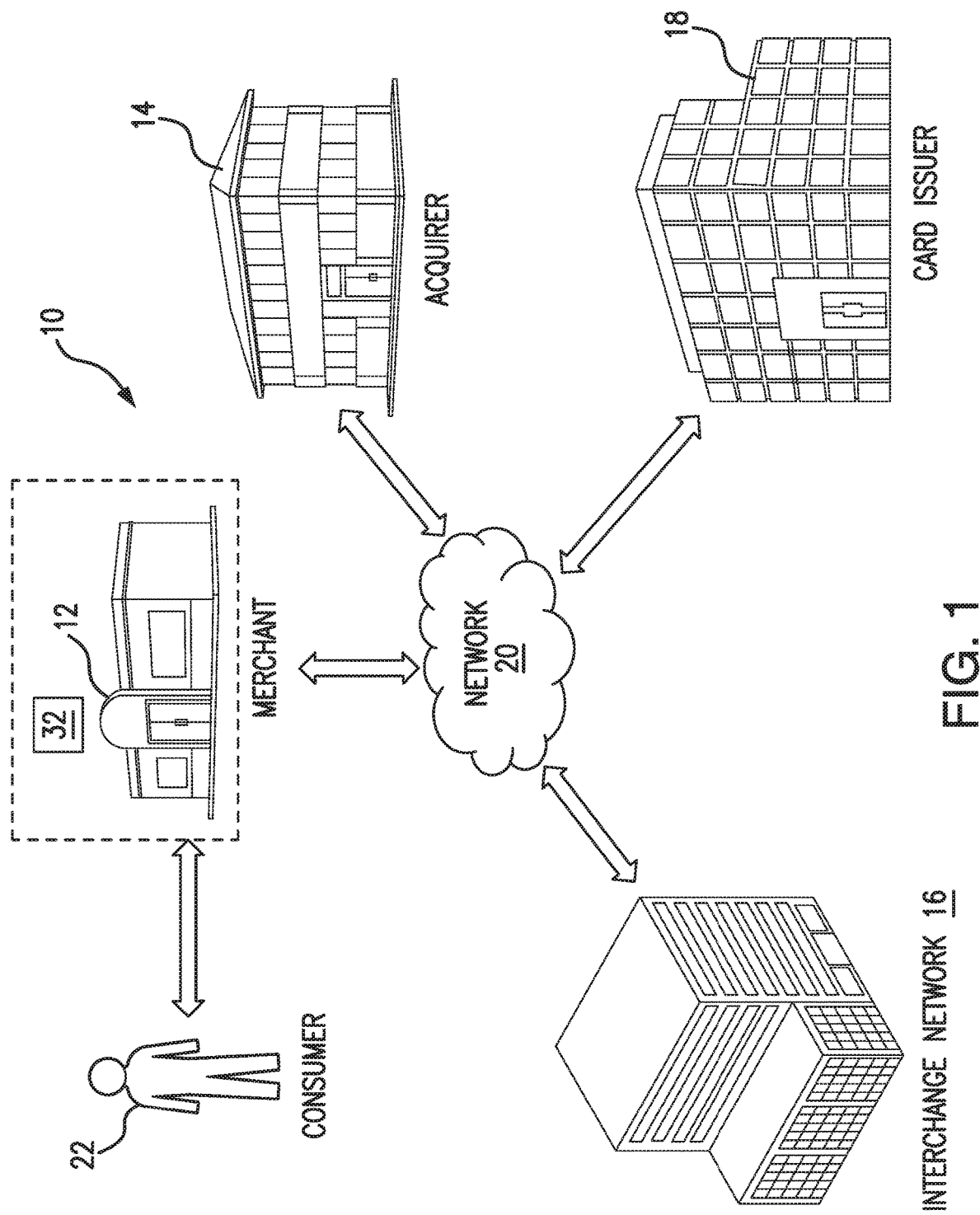
FIG. 1 is a block diagram illustrating an example multi-party transaction card network system, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

As used herein, the terms "transaction card," "financial transaction card," and "transaction card" may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Broadly characterized, the present disclosure relates to systems and methods for automatically disabling a payment function of a transaction card. A point-of-sale (POS) terminal includes one or more disabling components that are configured to destroy the payment function of the transaction card, and in particular, the magnetic strip and/or the micromodule. The POS terminal receives payment account data from a transaction card, which may be a stolen or lost transaction card. The POS terminal generates and transmits a payment authorization request message to a card issuer associated with the transaction card. The card issuer determines that the transaction card is stolen or lost and transmits an authorization request response message declining the transaction and including a status response code corresponding to a status of the transaction card. The status response code indicates that the transaction card is to be captured. The POS terminal then activates one of the disabling components to disable the payment function of the transaction card.

Exemplary Payment Network Systems

FIG. 1 is a block diagram illustrating an example multi-party transaction card network system 10, in accordance with one embodiment of the present disclosure. The example transaction card network system 10 generally includes merchants 12, acquirers 14, interchange networks 16, and card issuers 18, coupled in communication via a network 20. As used herein, the term "interchange network" includes an electronic network that exchanges data relating to the value of card sales and credits among the card issuers 18 and the acquirers 14.

The transaction card network system 10 facilitates providing interchange network services offered by the interchange network 16. In addition, the transaction card network system 10 enables transaction card transactions in which the merchants 12, the acquirers 14, and/or the card issuers 18 do not need to have a one-to-one relationship. As an example, the transaction card network system 10 may be utilized by the merchants 12 as part of a process of initiating a pre-authorization request for performing a transaction (as described herein). Although parts of the transaction card network system 10 are presented in one arrangement, other embodiments may include the same or different parts arranged otherwise, depending, for example, on pre-authorization processes for purchase transactions, communication between computing devices, etc.

The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, the issuers 18, and/or a consumer or cardholder 22 (also referred to herein as a "user"). Additionally, the network 20 may include more than one type of network, such as a private payment transaction network provided by the interchange network 16 to the acquirers 14 and/or the card issuers 18, and separately, the public Internet, which may facilitate communication between the merchants 12, the interchange network 16, the acquirers 14, and/or the cardholders 22.

Embodiments described herein relate to a transaction card system, such as a credit card payment system using the Mastercard® interchange network. (Mastercard is a registered trademark of Mastercard International Incorporated.) The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a transaction card issued by a card issuer, purchase data representing a purchase made by the consumer, including a type of merchant, amount of purchase, date of purchase, and other data, which may be transmitted between any parties of multi-party transaction card network system 10.

In a typical transaction card system, a financial institution called the "issuer" issues a transaction card, such as a debit card or credit card, to the user or cardholder 22, who uses the transaction card to tender payment for a purchase from the merchant 12. The merchant 12 is typically associated with products, for example, and without limitation, goods and/or services, that are offered for sale and are sold to the cardholders 22. The merchant 12 includes, for example, a physical location and/or a virtual location. A physical location includes, for example, a brick-and-mortar store, etc., and a virtual location includes, for example, an Internet-based store-front.

To accept payment with the transaction card, the merchant 12 must normally establish an account with a financial institution that is part of the transaction card network system 10. This financial institution is usually called the "merchant bank," the "acquiring bank," or the acquirer 14.

When the cardholder 22 provides payment for a purchase with the transaction card, the merchant 12 requests authorization from the acquirer 14 for the purchase amount. The request may be performed over the telephone but is usually performed using a point-of-sale (POS) terminal, such as a POS terminal 32, that reads the consumer's account information from a magnetic stripe, a chip, or embossed characters on the transaction card, and communicates electronically with the transaction processing computers of the acquirer 14. In some embodiments, the acquirer 14 may authorize a third party (not shown) to perform transaction processing on its behalf. In this case, the POS terminal 32 will be configured to communicate with the third party. Such a third party is usually called a "merchant processor," an "acquiring processor," or a "third party processor."

Using the interchange network 16, computers of the acquirer 14 or merchant processor will communicate with computers of the card issuer 18 to determine whether the cardholder's account is in good standing and whether the purchase is covered by the cardholder's available credit line or account balance. Based on a determination regarding the cardholder's account standing and funds availability, the request for authorization will be declined or accepted, and an authorization request response is transmitted by the card issuer 18 to the acquirer 14, and then to the merchant 12. The authorization request response can include, among other things, a result of the determination that the transaction is approved or declined and/or information about the status of the transaction card or payment account. If the request is accepted, an authorization code is issued to the merchant 12. If the request is declined, the authorization request response may include a message instructing the merchant, for example, to capture or pick up the transaction card.

Information that the card issuer 18 can convey in an authorization request response includes information that the transaction card has been reported by the customer to be lost or stolen. That is, a customer can report to the card issuer 18 that the transaction card has been lost or stolen, and the card issuer 18 can update their records to reflect the status of the transaction card as lost or stolen. As such, if the card issuer 18 receives an authorization request for a transaction performed with the transaction card that has been reported lost or stolen, the card issuer 18 can provide the status information of the transaction card in the authorization request response to the merchant 12 via the acquirer 14 and interchange network 16. For example, and without limitation, the authorization request response can include a status identifier indicating that the transaction card has been reported to be lost or stolen. The status identifier can include, for example, a status response code value of "04," "41," or "43" indicating that the transaction card is to be captured.

When a request for authorization is accepted, the available funds or a credit line of the cardholder's account is decreased. Normally, a charge for a transaction card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 22 cancels a transaction before it is captured, a "void" is generated. If the cardholder 22 returns goods after the transaction has been captured, a "credit" is generated. The interchange network 16 and/or the card issuer 18 stores the transaction data, such as, and without limitation, the primary account number (PAN) and expiry date of the transaction card, a type of merchant, a merchant identifier, a location where the transaction was performed, a dollar amount of the transaction, a merchant category code, a date and time of the transaction, products purchased and related descriptions or identifiers, etc., in a transaction database (not shown).

After the transaction has been authorized, the transaction is cleared and settled among the parties to the transaction, such as the acquirer 14 and the card issuer 18. Clearing refers to the communication of financial data for reconciliation purposes between the parties. Settlement refers to the transfer of funds between the merchant's account, the acquirer 14, and the card issuer 18 associated with the transaction.

While only one merchant 12, acquirer 14, interchange network 16, and card issuer 18 are shown in FIG. 1 (for ease of reference), it should be appreciated that a variety of other embodiments may include multiple ones of these parts in various combinations.

Figure 2:
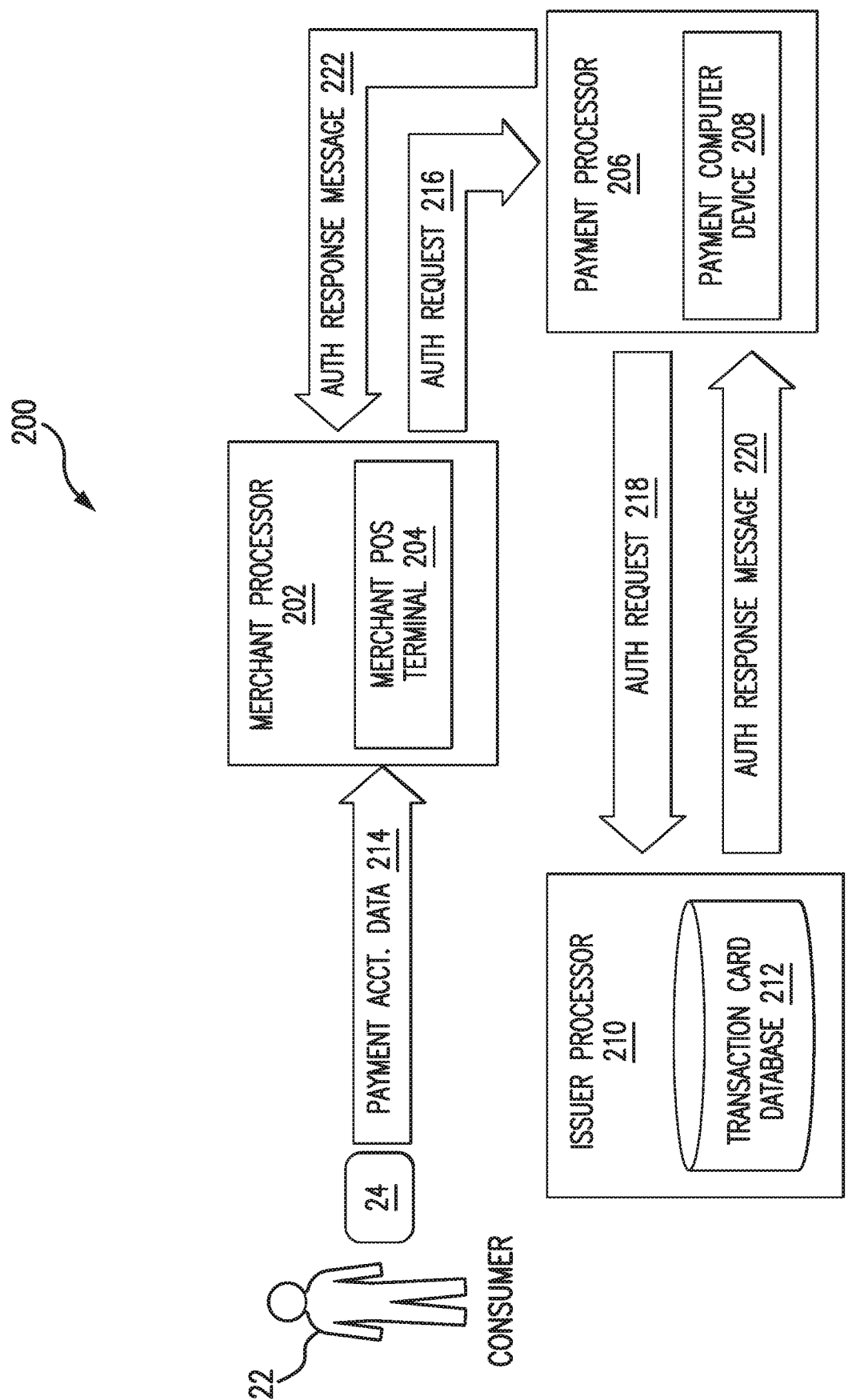
FIG. 2 is a block diagram of a transaction card account system, such as the network system shown in FIG. 1, showing data flow among the parties of the system.

FIG. 2 is a block diagram of a transaction card account system 200 showing data flow among a transaction card 24, a merchant processor 202, a payment processor 206, and an issuer processor 210. In the example embodiment, the system 200 is a transaction card account system such as the transaction card network system 10 (shown in FIG. 1). In some embodiments, the payment processor 206 is an interchange network, such as the interchange network 16 (shown in FIG. 1). The transaction card 24 is configured to allow the cardholder 22 to access the merchant processor 202, for example, via a merchant POS terminal 204, which is a point-of-sale device such as the POS terminal 32 (shown in FIG. 1). The transaction card 24 can be used to purchase goods and/or services associated with a merchant, such as the merchant 12 (shown in FIG. 1). In the example embodiment, the transaction card 24 is capable of being operably coupled with the merchant POS terminal 204 (as described herein).

In the example embodiment, the merchant processor 202 includes the merchant POS terminal 204. As described, the merchant POS terminal 204 is a computer device such as the POS terminal 32. The merchant POS terminal 204 is a service-provided device that is coupled in communication with the merchant processor 202. In the exemplary embodiment, the transaction card 24 transmits payment account data 214 to the merchant POS terminal 204 when making a purchase from the merchant 12. The transaction card 24 is configured to transmit the payment account data 214 via, for example, a magnetic swipe, EMV chip, or wirelessly, via near field communication (NFC) enabled circuitry, to the merchant POS terminal 204. The payment account data 214 may include, for example, transaction information that indicates a PAN or token associated with a PAN of the cardholder 22.

The merchant processor 202 receives the payment account data 214 and generates a payment authorization request message 216. The payment authorization request message 216 is transmitted to the payment computer device 208 for processing and further transmission to an issuing bank for approval (shown as payment authorization request message 218). In one embodiment, the payment computer device 208 includes an interchange computer associated with an interchange, such as the interchange network 16.

The issuer processor 210 receives the payment authorization request message 218 and retrieves a status of the transaction card 24, for example, from a transaction card database 212. For example, and without limitation, in one embodiment, the cardholder 22 may have reported his or her transaction card 24 as being lost or stolen. In such an instance, the transaction card database 212 will contain an indicator that the transaction card 24 should be captured or picked up by the merchant 12.

The issuer processor 210 transmits an authorization request response message 220 to the payment computer device 208, which forwards the authorization request response message to the merchant processor 202 (shown as authorization request response message 222). Based on the details included in the authorization request response message 222, the merchant POS terminal 204 may, for example, and without limitation, complete the transaction, ask the cardholder 22 to tap, dip, or swipe the transaction card 24 again, and/or perform one or more operations configured to disable the payment function of the transaction card 24.

Exemplary Transaction Card

Figure 3:
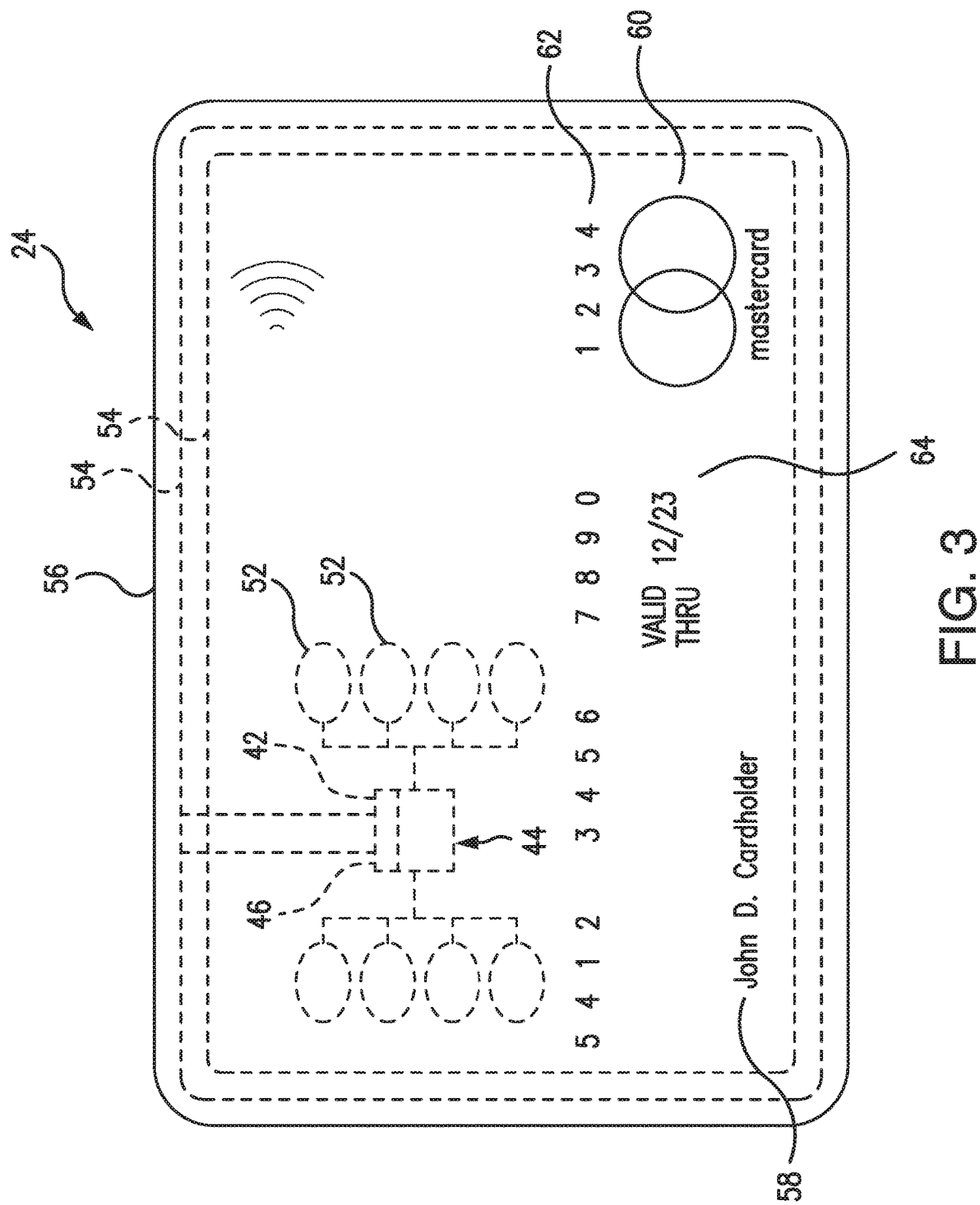
FIG. 3 is a schematic front view of a transaction card shown in FIG. 2.

FIG. 3 is a schematic front view of the transaction card 24. In the exemplary embodiment, the transaction card 24 includes an embedded integrated circuit (IC) or micromodule 42 that stores and transmits data between electronic devices. The micromodule 42 includes a silicon IC chip with a memory device 44 for storing data/instructions and a processor 46. In the exemplary embodiment, the data stored on the micromodule 42 is associated with one or more payment accounts linked to respective funding sources, such as a consumer deposit account (not shown). As described herein, the data includes payment account information such as the PAN and an expiry date of the transaction card 24.

As shown in FIG. 3, the micromodule 42 includes a plurality of electrical contacts 52 for communication between the transaction card 24 and the POS terminal 32 (shown in FIG. 1). In addition, in some embodiments, the transaction card 24 includes an antenna 54, which is provided for contactless communication, such as, for example, NFC. For example, in such an embodiment, the antenna 54 generates a magnetic field when it vibrates at a selected frequency. Specifically, the antenna 54 is configured to vibrate at a frequency of about 13.56 MHz, which is suitable for use in an NFC system.

The antenna 54 transmits radio signals to and receives radio signals from other NFC-enabled computing devices, for example, the merchant POS terminal 32, and/or any other components used in NFC systems. In NFC systems, at least one NFC component generates a magnetic field to inductively transfer currents and, thereby, exchange signals and information with other NFC components positioned within the magnetic field. In the exemplary embodiment, the antenna 54 functions as an NFC component to send and receive signals. The antenna 54 is configured to transmit radio signals to NFC components positioned within the magnetic field of the antenna 54, such as when the POS terminal 32 is located within a predetermined distance of the transaction card 24. As such, the antenna 54 sends and receives radio signals from NFC components when the antenna 54 is positioned within the magnetic field of the NFC components. Accordingly, the micromodule 42 includes a radio frequency (RF) interface, an NFC device controller, and other NFC-enabled circuitry (not shown) to facilitate enabling NFC communication on the transaction card 24. The RF interface is configured to receive and transmit RF signals through the antenna 54. The NFC device controller is configured to process the received RF signals and to generate signals to be transmitted by the RF interface. The memory device 44 is configured to store data associated with transmitting and receiving the RF signals. Furthermore, the NFC device controller is coupled in communication with the processor 46.

The processor 46 contains control logic, input/output ports, etc. to enable the micromodule 42 to operate. While not described herein, it is noted that a person skilled in the art of chip and/or contactless cards will be familiar with the necessary specifications, such as Mastercard contactless specifications, available under license from Mastercard.

The transaction card 24 includes a laminated body 56, which houses the micromodule 42 and antenna 54. In addition, the transaction card 24 includes a consumer's name 58 and a logo 60 of a financial company whose services are used by the cardholder (e.g., Mastercard). Moreover, the transaction card 24 includes the PAN 62 and an expiration date 64. The PAN 62 corresponds to the consumer's financial account, which is generally held by the card issuer 18. The name 58, logo 60, PAN 62, and expiration date 64 may be printed on the front surface, the back surface, and/or in any combination of the front and back surface of the laminated body 56.

Figure 4:
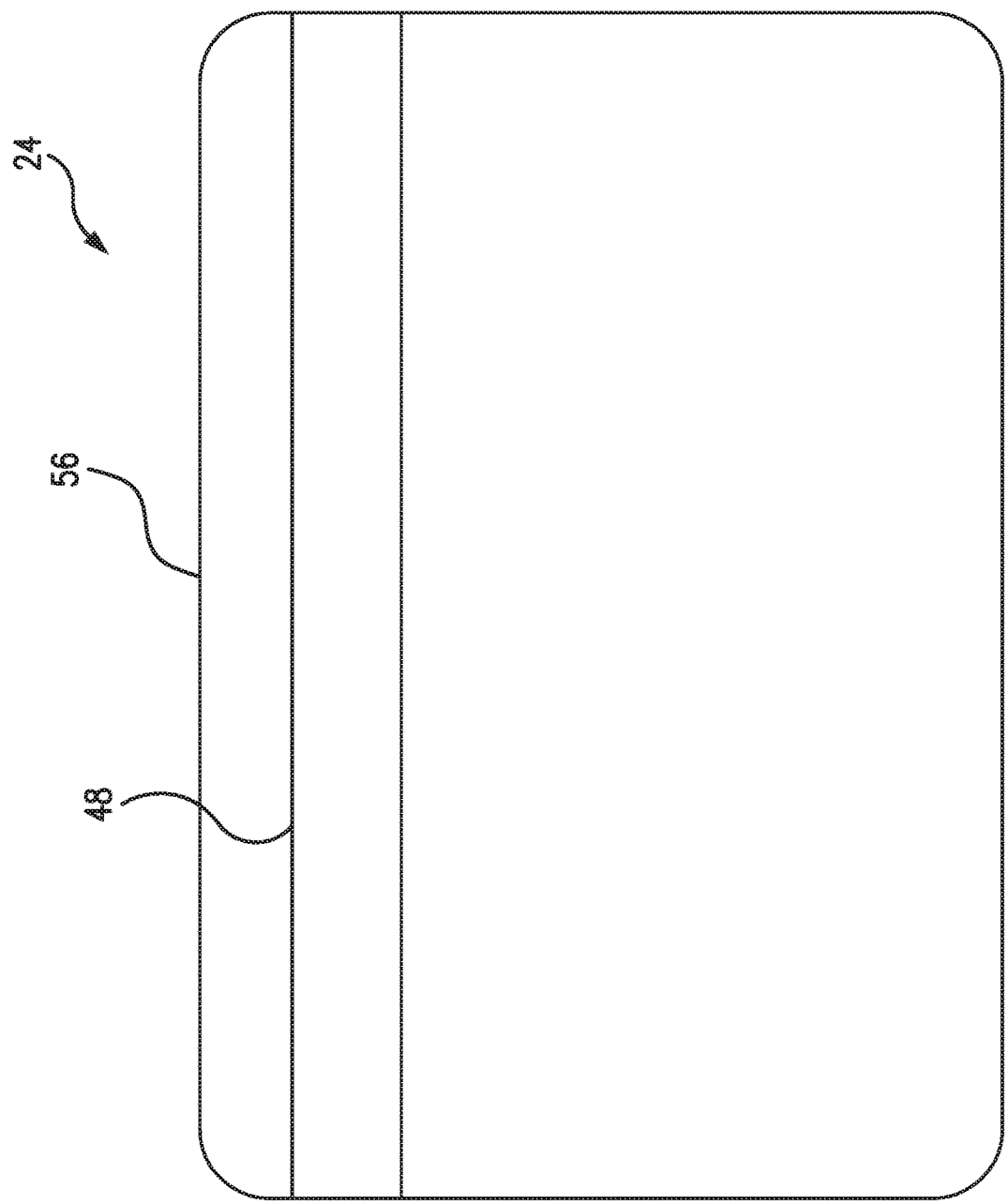
FIG. 4 is a schematic back view of the transaction card shown in FIG. 3.

FIG. 4 is a schematic back view of the transaction card 24. In the exemplary embodiment, the rear surface of the transaction card 24 includes a magnetic stripe 48 that extends generally all the way across the width of the laminated body 56. The magnetic stripe 48 stores, for example, substantially the same information (e.g., the PAN 62 and expiration date 64) that is stored in the memory device 44 of the micromodule 42 and displayed on the transaction card 24. The magnetic stripe 48 is configured to allow conventional magnetic stripe reader components of POS terminals, such as the POS terminal 32, to read the PAN 62 and other information from the magnetic stripe 48. Furthermore, the rear surface of the transaction card 24 may include conventional features that are not indicated in FIG. 5. Such features may include, for example, an adhesive paper strip for receiving a cardholder's handwritten signature, a printed CVC security code, a printed customer service toll-free telephone number, a hologram for security purposes, various logos or legal notices, etc.

Exemplary Computer Systems

Figure 5:
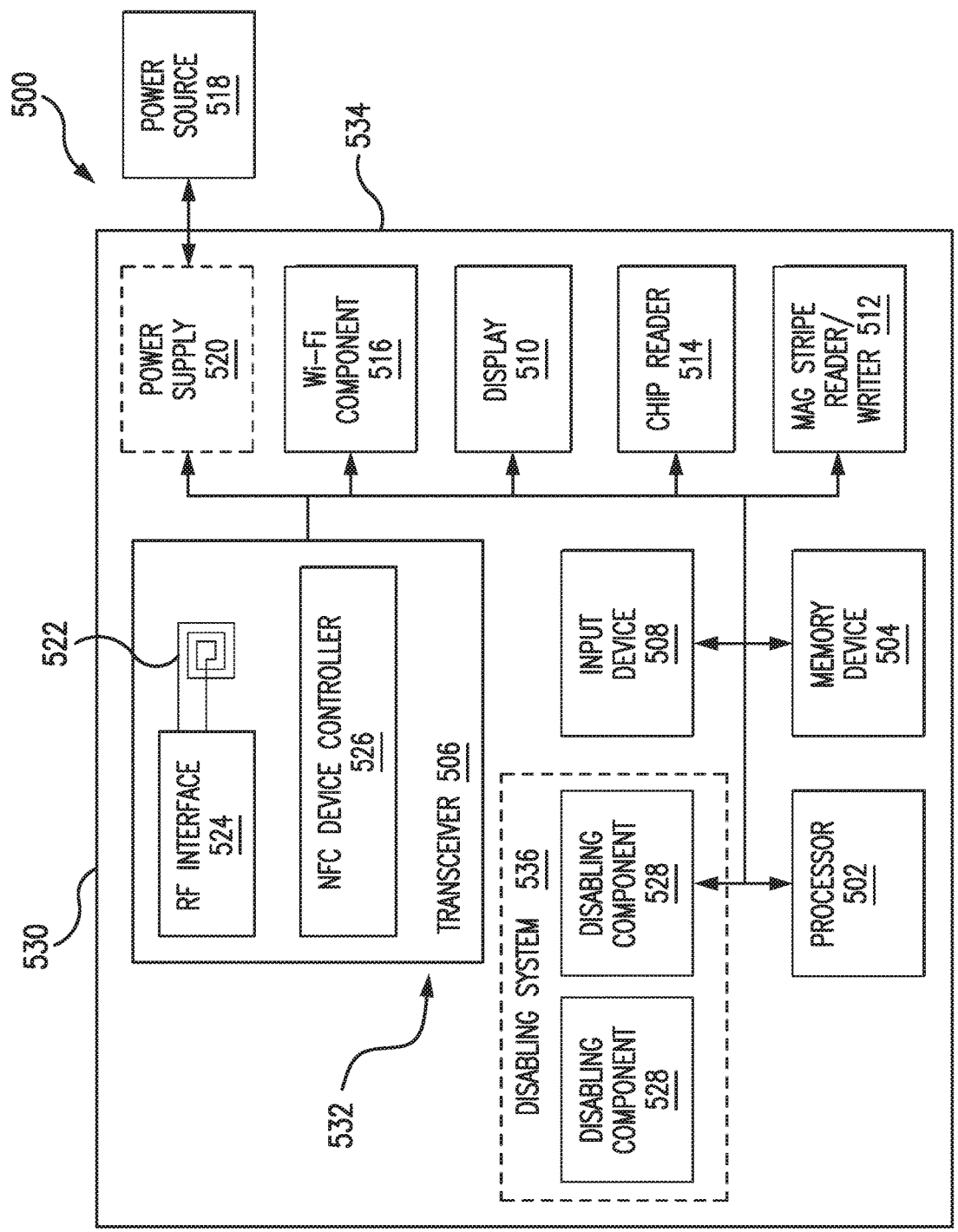
FIG. 5 is an example configuration of a merchant point-of-sale (POS) terminal shown in FIG. 1, which may be used by a merchant shown in FIG. 1.

FIG. 5 is an example configuration of a merchant point-of-sale (POS) terminal 500 that may be used by a merchant, such as the merchant 12 (shown in FIG. 1). In some embodiments, the POS terminal 500 is the POS terminal 32 (shown in FIG. 1). In the example embodiment, the POS terminal 500 is a computing device configured to read and/or write to the transaction card 24 (shown in FIG. 2) and to communication with one or more of the acquirer 14, the interchange network 16, the card issuer 18 (all shown in FIG. 1), and/or other computing devices (not shown).

In the exemplary embodiment, the POS terminal 500 generally includes a processor 502, a memory device 504, a transceiver 506 (e.g., a wireless communication device), an input device 508, a display 510, a magnetic stripe reader/writer 512, and a chip card reader 514. In addition, in some embodiments, the POS terminal 500 includes an integrated Wi-Fi component 516 (e.g., implementing the Institute of Electrical and Electronics/IEEE 802.11 family of standards). The POS terminal 500 may include an external power source 518 to receive power, or alternatively, in some embodiments, the POS terminal 500 may include an internal power supply 520 (e.g., a battery or other self-contained power source).

The processor 502 includes one or more processing units (e.g., in a multi-core configuration) specially programmed for executing computer readable instructions. The instructions may be executed within a variety of different operating systems (OS) on the POS terminal 500, such as UNIX, LINUX, Microsoft Windows®, etc. More specifically, the instructions may cause various data manipulations on data stored in the memory device 504 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 504 is any device allowing information, the executable instructions, and/or written works to be stored and retrieved. The memory device 504 includes one or more computer readable media.

In the example embodiment, the processor 502 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the POS terminal 500 may be widely deployed, it may be impractical to manually update software for each POS terminal 500. Therefore, the system 10 (shown in FIG. 1) provides a mechanism for automatically updating the software on the POS terminal 500. For example, an updating mechanism may be used to automatically update any number of components and their drivers, both network and non-network components, including system level (OS) software components. In some embodiments, the POS terminal 500 components are dynamically loadable and unloadable; thus, they may be replaced in operation without having to reboot the OS.

Stored in the memory device 504 are, for example, computer readable instructions for providing a user interface to the user via the display 510 and, optionally, receiving and processing input from the input device 508. A user interface may include, among other possibilities, a payment application. A payment application allows the cardholder 22 (shown in FIG. 1) to interact with the POS terminal 500 to transmit transaction information related to the customer's purchase and financial account.

In the example embodiment, the display 510 can include, for example, and without limitation, a liquid crystal display (LCD), an organic light emitting diode (OLED) display, an "electronic ink" display, and the like. In some embodiments, a single component such as a touch screen may function as both an output device (e.g., the display 510) and the input device 508. As such, the display 510 may optionally include a touch controller for support of touch capability. In such embodiments, the POS terminal 500 may detect a person's presence by detecting that the person has touched the display 510 of the POS terminal 500.

In one embodiment, the transceiver 506 includes an antenna 522. The antenna 522 includes a looped wire configured to transmit radio signals when current flows through the looped wire. The antenna 522 is any size, shape, and configuration that is suitable for transmitting signals as described herein. For example, the antenna 522 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 522 generates a magnetic field when it vibrates at a selected frequency. Specifically, the antenna 522 is configured to vibrate at a frequency of about 13.56 MHz, which is suitable for use in an NFC system.

In the example embodiment, the antenna 522 transmits radio signals to and receives radio signals from other NFC-enabled computing devices, for example, the transaction card 24 (shown in FIG. 2) or any other components used in NFC systems. In NFC systems, at least one NFC component generates a magnetic field to inductively transfer currents and, thereby, exchange signals and information with other NFC components positioned within the magnetic field. In the exemplary embodiment, the antenna 522 functions as an NFC component to send and receive signals. The antenna 522 is configured to transmit radio signals to NFC components positioned within the magnetic field of the antenna 522, such as when the transaction card 24 is located within a predetermined distance of the POS terminal 500. Therefore, the magnetic field generated by the antenna 522 defines the active range of the POS terminal 500. Additionally, the antenna 522 receives radio signals from NFC components when the antenna 522 is positioned within the magnetic field of the NFC components.

The transceiver 506 also includes a radio frequency (RF) interface 524 and an NFC device controller 526. The RF interface 524 and the NFC device controller 526 are powered by the power source 518, and in some embodiments, the internal power supply 520 and/or the display 510. In addition, the processor 502 and the memory device 504 are powered in the same manner. The RF interface 524 is configured to receive and transmit RF signals through the antenna 522. The NFC device controller 526 is configured to process the received RF signals and to generate signals to be transmitted by the RF interface 524. The memory device 504 is configured to store data associated with transmitting and receiving the RF signals. The NFC device controller 526 is coupled in communication with the processor 502.

In the example embodiment, the POS device 500 also includes a disabling system 536 having one or more disabling components 528 configured to electronically and/or physically disable one or more of the magnetic stripe 48 and/or the micromodule 42 of the transaction card 24. For example, and without limitation, the disabling component(s) 528 can include one or more of the following: (i) a punching device configured to punch one or more holes through the transaction card 24, and in particular, the magnetic stripe 48 and/or the micromodule 42; (ii) a magnet (e.g., a neodymium magnet) having sufficient magnet force to erase any data stored on the magnetic stripe 48; (iii) an electrical circuit configured to short-circuit the micromodule 42; (iv) a cutting device configured to cut or shred the magnetic stripe 48 and/or the micromodule 42; (v) a software component having instructions configured to cause the processor 502 to overwrite transaction data stored on the transaction card 24; and (vi) and any other component that enables the POS terminal 500 to function described herein. It is noted that one or more of the disabling components 528 can implement other components of the POS device 500 to disable the payment function of the transaction card 24 (e.g., instructing the processor 502 to cause other components to overwrite the transaction data).

In the exemplary embodiment, the transceiver 506 is configured for reading transaction card account data from the transaction card 24, and in particular, from the micromodule 42 (shown in FIG. 3), to conduct a purchase transaction. In addition, in certain embodiments, the transceiver

506 is also configured for writing various data to the transaction card 24, and in particular, to the micromodule 42, to destroy the payment function of a transaction card 24. The antenna 522 enables the POS device 500 to transmit signals configured to erase and/or overwrite the existing data (i.e., the transaction card account data) stored in the memory device 44 with, for example, all one or zeros and/or random data.

The magnetic stripe reader/writer 512 is configured for reading transaction card account data from the transaction card 24, and in particular, from the magnetic stripe 48 (shown in FIG. 4), to conduct a purchase transaction. The magnetic stripe reader/writer 512 includes components for reading a changing magnetic field from the magnetic stripe 48. During a purchase transaction, the magnetic stripe reader/writer 512 provides Track 1 and/or Track 2 data to the POS device 500 for purchase transaction processing. In particular, the POS device 500 transmits the cardholder's transaction card credentials and other transaction information to the acquirer 14 (shown in FIG. 1) operating as or on-behalf-of the merchant 12.

In addition, in certain embodiments, the magnetic stripe reader/writer 512 is configured for writing various data to the transaction card 24, and in particular, to the magnetic stripe 48, to destroy the payment function of a transaction card 24. The magnetic stripe reader/writer 512 includes components for writing a changing magnetic field to the magnetic stripe 48, thereby overwriting the existing magnetic field (i.e., the transaction card account data). During a card data destruction process, the magnetic stripe reader/writer 512 overwrites the Track 1 and/or Track 2 data stored in the magnetic stripe 48 with, for example, all one or zeros and/or random data.

Moreover, the chip reader 514 is configured similarly as the magnetic stripe reader/writer 512. The chip reader 514 is configured for reading transaction card account data from the transaction card 24, and in particular, from the micromodule 42 (shown in FIG. 3), to conduct a purchase transaction. The chip reader 514 includes components (not shown) for contacting one or more of the electrical contacts 52 and reading the digital data stored in the memory device 44. In addition, in certain embodiments, the chip reader 514 is also configured for writing various data to the transaction card 24, and in particular, to the micromodule 42, to destroy the payment function of a transaction card 24. The components for contacting one or more of the electrical contacts 52 enable the POS device 500 to overwrite the existing data (i.e., the transaction card account data) stored in the memory device 44 with, for example, all one or zeros and/or random data.

In the example embodiment, the POS terminal 500 includes a housing 530 at least partly (and more preferably, at least substantially or entirely) enclosing the components described above. In addition, the POS terminal 500 includes circuitry 532 configured to communicate with the transaction card 24. The circuitry 532 may include, for example, leads, connectors, NFC-enabled circuitry, Wi-Fi-enabled circuitry, and the like. The housing 530 is preferably configured to seal the circuitry 532, which is susceptible to degradation from the ambient environment. In one embodiment, the circuitry 532 is hermetically sealed in the housing 530. For example, in one embodiment, the circuitry 532 is completely and permanently encased within the housing 530. In other words, the housing 530 and the circuitry 532 are intended to remain as a single, inseparable unit throughout the life of the POS terminal 500. It is understood that the housing 530 can be formed separately from the circuitry 532 and that the circuitry 532 can be placed into and sealed within the housing 530 in a separate operation. It is also understood that the housing 530 can be oversized with respect to the circuitry 532 so that the circuitry 532 can be placed loosely into the housing 530. In another embodiment, the circuitry 532 can be selectively, sealingly enclosed within the housing 530, where the housing 530 includes a closure 534 removably attached to a body of the housing 530.

The housing 530 is fabricated from a suitably selected material that facilitates inhibiting the effect the material has on the signal being emitted from, for example, the transceiver 506 and/or the Wi-Fi component 516 and passing through the housing material. For example, and without limitation, suitable materials from which the housing 530 may be fabricated include polyethylene, propylene, isoprene, and butylenes (i.e., polyolefins). In other embodiments, the housing 530 is fabricated from any material that enables the POS terminal 500 to function as described herein.

In some embodiments, the POS terminal 500 may be connected to one or more peripheral devices (not shown). That is, the POS terminal 500 may communicate various data with one or more peripheral devices. For example, the POS terminal 500 may communicate with one or more peripheral devices through the Wi-Fi component 516, the transceiver 506, or other suitable means.

Figure 6:
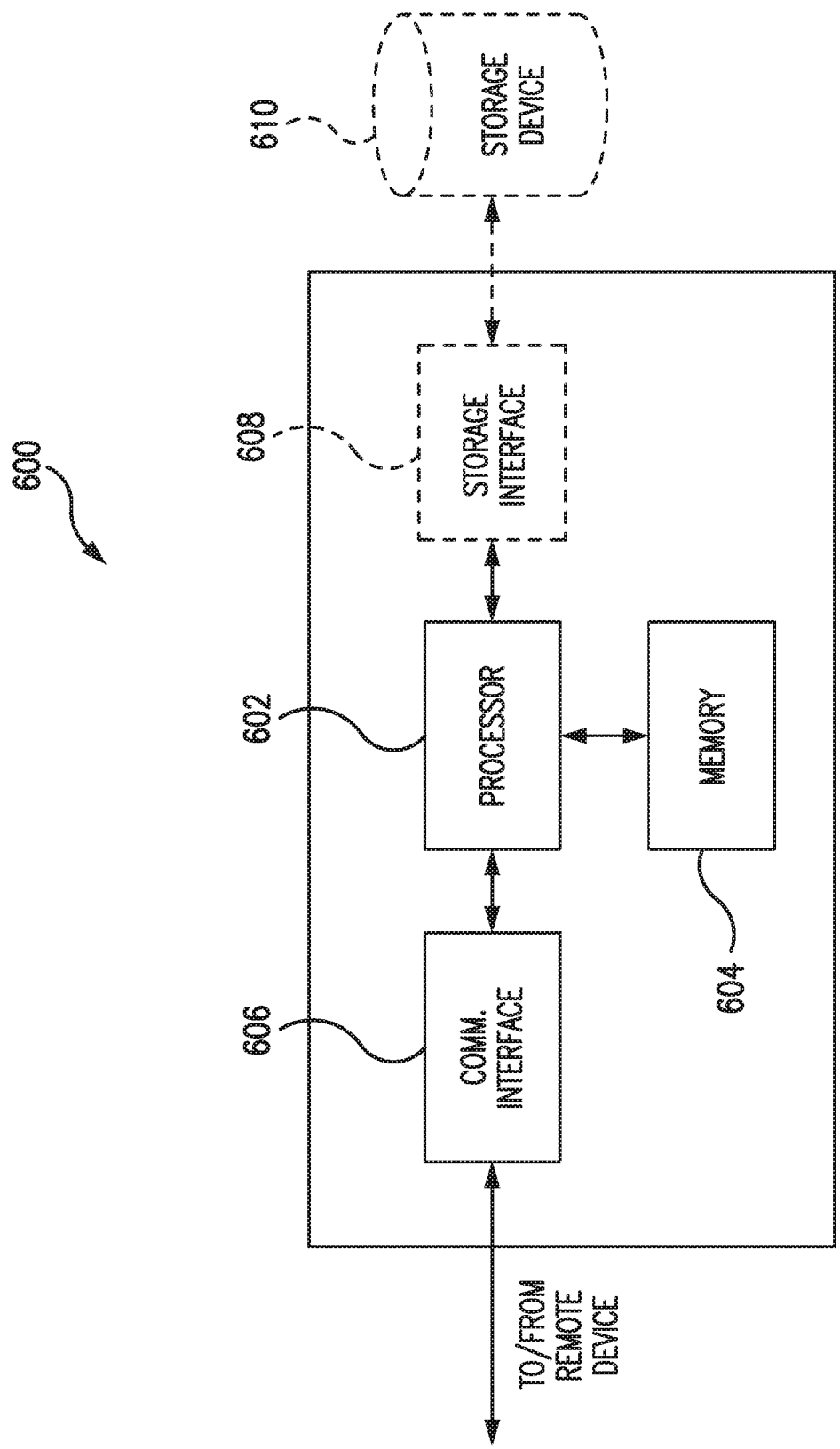
FIG. 6 is an example configuration of a server system, such as an issuer processor shown in FIG. 2.

FIG. 6 is an example configuration of a server system 600, such as the issuer processor 210 (shown in FIG. 2). In the example embodiment, the server system 600 includes a processor 602 for executing instructions. The instructions may be stored in a memory area 604, for example. The processor 602 includes one or more processing units (e.g., in a multi-core configuration) for executing the instructions. The instructions may be executed within a variety of different operating systems on the server system 600, such as UNIX, LINUX, Microsoft Windows®, etc. More specifically, the instructions may cause various data manipulations on data stored in a storage device 610 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). In the example embodiment, the processor 602 may be implemented as one or more cryptographic processors, as described above with respect to the user system 600.

The processor 602 is operatively coupled to a communication interface 606 such that the server system 600 can communicate with a remote device, such as another server system 600 at the interchange network 16 (shown in FIG. 1). For example, the communication interface 606 may receive communications originating from the POS terminal 32 via the Internet, as illustrated in FIG. 1.

The processor 602 is operatively coupled to the storage device 610. The storage device 610 is any computer-operated hardware suitable for storing and/or retrieving data. In some embodiments, the storage device 610 is integrated in the server system 600. In other embodiments, the storage device 610 is external to the server system 600 and is similar to the transaction card database 212 (shown in FIG. 2). For example, the server system 600 may include one or more hard disk drives as the storage device 610. In other embodiments, the storage device 610 is external to the server system 600 and may be accessed by a plurality of server systems 600. For example, the storage device 610 may include multiple storage units such as hard disks or solid-state disks in a redundant array of inexpensive disks (RAID) configuration. The storage device 610 may include a storage area network (SAN) and/or a network attached storage (NAS) system.

In some embodiments, the processor 602 is operatively coupled to the storage device 610 via a storage interface 608. The storage interface 608 is any component capable of providing the processor 602 with access to the storage device 610. The storage interface 608 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 602 with access to the storage device 610.

The memory area 604 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

Exemplary Computer-Implemented Methods

Figure 7:
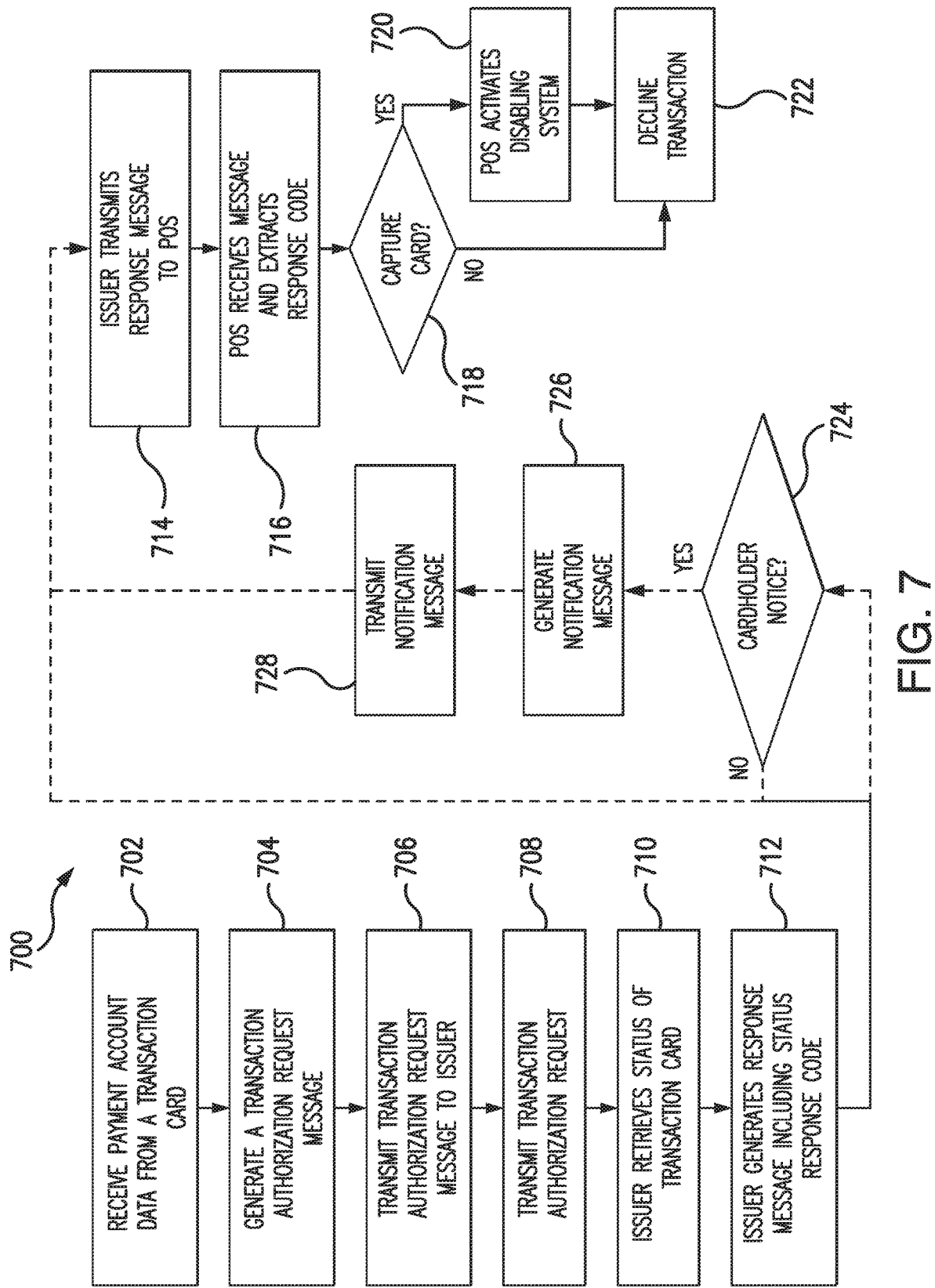
FIG. 7 is a flowchart illustrating an exemplary computer-implemented method for disabling the payment function of a transaction card, in accordance with one embodiment of the present disclosure.

FIG. 7 is a flowchart illustrating an exemplary computer-implemented method 700 for disabling the payment function of a transaction card, in accordance with one embodiment of the present disclosure. The operations described herein may be performed in the order shown in FIG. 7 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 700 is described below, for ease of reference, as being executed by exemplary devices and components introduced with the embodiments illustrated in FIGS. 1-6. In one embodiment, the computer-implemented method 700 is implemented by the merchant POS terminal 32 (shown in FIG. 1). In the exemplary embodiment, the computer-implemented method 700 relates to disabling the payment function of a transaction card, such as the transaction card 24 (shown in FIG. 2). While operations within the computer-implemented method 700 are described below regarding the merchant POS terminal 32, according to some aspects of the present invention, the computer-implemented method 700 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 702, a POS terminal, such as the POS terminal 32 belonging to the merchant 12 (shown in FIG. 1), receives payment account data, such as the cardholder's payment account data 214 (shown in FIG. 2), from a transaction card, such as the transaction card 24. In the exemplary embodiment, the cardholder payment account data 214 includes the PAN 62 (shown in FIG. 3), which corresponds to a transaction card account associated with a cardholder's financial account. The cardholder 22 (shown in FIG. 1) presents the transaction card 24 to the POS terminal 32 for reading of the payment account data 214. When the transaction card 24 is swiped, dipped, or tapped at the POS terminal 32, the POS terminal 32 reads the PAN 62 from the transaction card 24, which may be printed, embossed, stored in the magnetic stripe 48, or in the memory device 44 of the transaction card 24, in the case of a chip card, smart card, or other transaction card having an ability to electronically store the PAN 62. The PAN 62 is typically eight (8) to nineteen (19) digits long and includes several fields reserved for particular uses. For example, when following the International Organization for Standardization (ISO) standards, the first six (6) digits of the PAN are referred to as an Issuer Identification Number (IIN) or Bank Identification Number (BIN), the first ($1^{st}$) digit of which is a Major Industry Identifier (MII). The IIN or BIN identifies the institution that issued the transaction card 24 to the cardholder 22. The following field, which may be of a variable length, identifies an individual account. A single check digit typically occupies the last digit of the PAN 62.

In the exemplary embodiment, swiping the transaction card 24 involves the cardholder 22 passing the magnetic strip 48 past the magnetic stripe reader/writer 512 (shown in FIG. 5) of the POS terminal. Dipping of the transaction card 24 involves the cardholder 22 placing the card adjacent the chip reader 514, for example, by inserting the transaction card 24 into a slot (not shown) defined in the housing 530 of the POS terminal, such that the micromodule 42 (shown in FIG. 3) is in contact with the chip reader 514. Furthermore, tapping the transaction card 24 at the POS terminal involves placing the transaction card 24 within a predetermined distance of the POS terminal, such that a magnetic field generated by the antenna 522 (shown in FIG. 5) can receive radio signals from the transaction card 24.

At operation 704, the POS terminal 32 generates an electronic transaction authorization request message, such as the payment authorization request message 216 (shown in FIG. 2), that includes transaction information as well as the payment account data (e.g., the cardholder's payment account data 214). For example, and without limitation, the cardholder payment account data 214 is included in the electronic transaction authorization request message. Typical electronic transaction messages may be formatted pursuant to one or more standards, such as the International Organization of Standardization ISO 8583 standard, and may include a plurality of data elements, where each data element may be configured to store payment and transaction data as set forth in the associated standards. The data elements may include, for example, a data element configured to store the PAN, a data element configured to store a transaction type, a data element configured to store a transaction amount, a data element configured to store a transaction time, etc. The electronic transaction messages may also include a message type indicator, which may be indicative of a type of the electronic transaction message, such as a payment authorization request, authorization request response, etc. In some instances, an electronic transaction message may also include a bitmap, which may indicate the data elements included in the electronic transaction message and the data stored therein.

At operation 706, the POS terminal 32 transmits the transaction authorization request message to a card issuer associated with the transaction card, such as the card issuer 18 (shown in FIG. 1), for example, via a payment network (e.g., the interchange network 16 (shown in FIG. 1)) for normal authorization processing.

At operation 708, the card issuer 18, and more particularly, the issuer processor 210 (shown in FIG. 2), receives the transaction authorization request message (e.g., the payment authorization request message 218 (shown in FIG. 2)) including the cardholder payment account data 214 from the interchange network 16. At operation 710, based on the PAN 62 contained in the payment authorization request message 218, the card issuer 18 retrieves a status of the transaction card 24, for example, from the transaction card database 212 (shown in FIG. 2). For example, and without limitation, in one embodiment, the cardholder 22 may have reported his or her transaction card 24 as being lost or stolen. In such an instance, the transaction card database 212 contains a status indicator indicating that the transaction card 24 should be captured or picked up (or otherwise disable, as described herein) by the merchant 12.

At operation 712, the issuer processor 210 generates an authorization request response message, such as the authorization request response message 220 (shown in FIG. 2), that includes a status response code (i.e., the status identifier) indicating that the transaction card 24 is to be captured. In the exemplary embodiment, the authorization request response message includes a message declining the transaction. For example, the authorization request response message is a message type indicator (MTI) 0110 authorization request response message indicating that the transaction is declined due to suspected fraud. The MTI 0110 message includes, for example, one or more the following data element 39 (DE 39) response codes.

| DE 39 | Description | Action |
|---|---|---|
| 04 | Capture card | Capture |
| 41 | Lost card | Capture |
| 43 | Stolen card | Capture |

In addition, in certain embodiments of the present disclosure, the MTI 0110 message may include one or more new DE 39 response codes, other new or existing data elements, and/or other forms of communication to the POS terminal indicating that the transaction card 24 is to be disabled or captured. That is, the "captured" terminology, as used herein, is not limited to the existing response codes.

In certain embodiments, the MTI 0110 message may include a fraud score stored in a data element of the MTI 0110 message. For example, the MTI 0110 message may contain a data element 48 (DE 48) that includes a fraud score, typically indicated in DE 48, sub element 75, and sub field 1, and indicating a value equal to or greater than a threshold value. Alternatively, accordingly to certain aspects of the disclosure, the fraud score may be contained in any data element of the MTI 0110 message and may have any value than enables the issuer processor 210 to function as described herein.

In the exemplary embodiment, at operation 714, the issuer processor 210 transmits the authorization request response message 220 to the merchant 12, and more particularly, to the POS terminal 32. At operation 716, the POS terminal 32 receives and parses the authorization request response message 220 to extract the status response code. As described herein, in the exemplary embodiment, the MTI 0110 received by the POS terminal 32 indicates that the transaction is declined. Rather than just declining the transaction, the POS terminal 32 extracts the status response code from the electronic transaction message and may temporarily store it in memory, such as memory device 504 (shown in FIG. 5).

At operation 718, the POS terminal 32 determines whether the extracted status response code indicates that the transaction card 24 is to be captured (e.g., the status response code has a value of "04," "41," or "43"), and if so, at operation 720 activates the disabling system 536 (shown in FIG. 5) to disable the payment function of the transaction card 24. The POS terminal 32 then declines the transaction at operation 722. If the POS terminal 32 determines that the extracted status response code does not indicate that the transaction card 24 is to be captured, then the method 700 continues to operation 722 (i.e., the POS terminal 32 declines the transaction).

In some embodiments, at operation 724, the issuer processor 210 determines whether the cardholder 22 has selected to receive a notification message corresponding to selected types of transactions, such as declined transactions due to suspected fraud. In some embodiments, the cardholder 22 may select to receive one or more notification messages of transactions associated with an account including, declined transactions with a status response code indicating that the transaction card 24 is to be captured. In one suitable example, the issuer processor 210 retrieves and analyzes the account event notification data stored in the transaction card database 212 for the cardholder 22 to confirm whether the notification data indicates that the cardholder 22 selected to receive a notification. If the cardholder 22 did not select to receive a notification message, the process ends at operation 720.

At operation 726, if the cardholder 22 selected to receive a notification message corresponding to declined transactions due to suspected fraud, the issuer processor 210 generates a corresponding notification message of the declined transaction. In the exemplary embodiment, the notification message may be generated in real time or near real time. As used herein, the term "real time" includes the time of occurrence of the associated events, the time to process data, and/or the time of a system response to the events and the environment. In the embodiments described herein, these activities and events occur substantially instantaneously.

The notification message is generated in a format that can be received by and presented to the cardholder 22, for example, on a cardholder mobile device and/or a cardholder computer system (both not shown). The notification message sent to a mobile device may be in a particular format and may conform to requirements defined by a mobile network operator. For example, and without limitation, a mobile network operator may specify that an SMS message has limitations on a number of characters and/or a predetermined memory size (e.g., bits, bytes, etc.).

At operation 728, the issuer processor 210 transmits the notification message to the cardholder 22. In particular, the issuer processor 210 may transmit the notification message to a cardholder mobile device via a preferred method of delivery selected by the cardholder 22 and stored as part of the account event notification data stored in the transaction card database 212 for the cardholder 22. In some embodiments, the preferred method of delivery may include, for example, and without limitation, the form of a push notification, an interactive voice response (IVR), an instant message (IM), an SMS message, a voicemail message, an email message, a web-based application message (e.g., via a payment application at the cardholder's mobile device, etc.), or any other suitable message form transmitted to the cardholder's mobile device and/or the cardholder's computer system. It should be understood that other notification message content and/or different delivery methods may be defined by the cardholder in the account event notification data stored in the transaction card database 212. Further, it should be understood that the issuer processor 210, for example, may provide the cardholder 22 additional modes of notification messages, such as audio notifications, that enable the method 700 to function as described herein.

Figure 8:
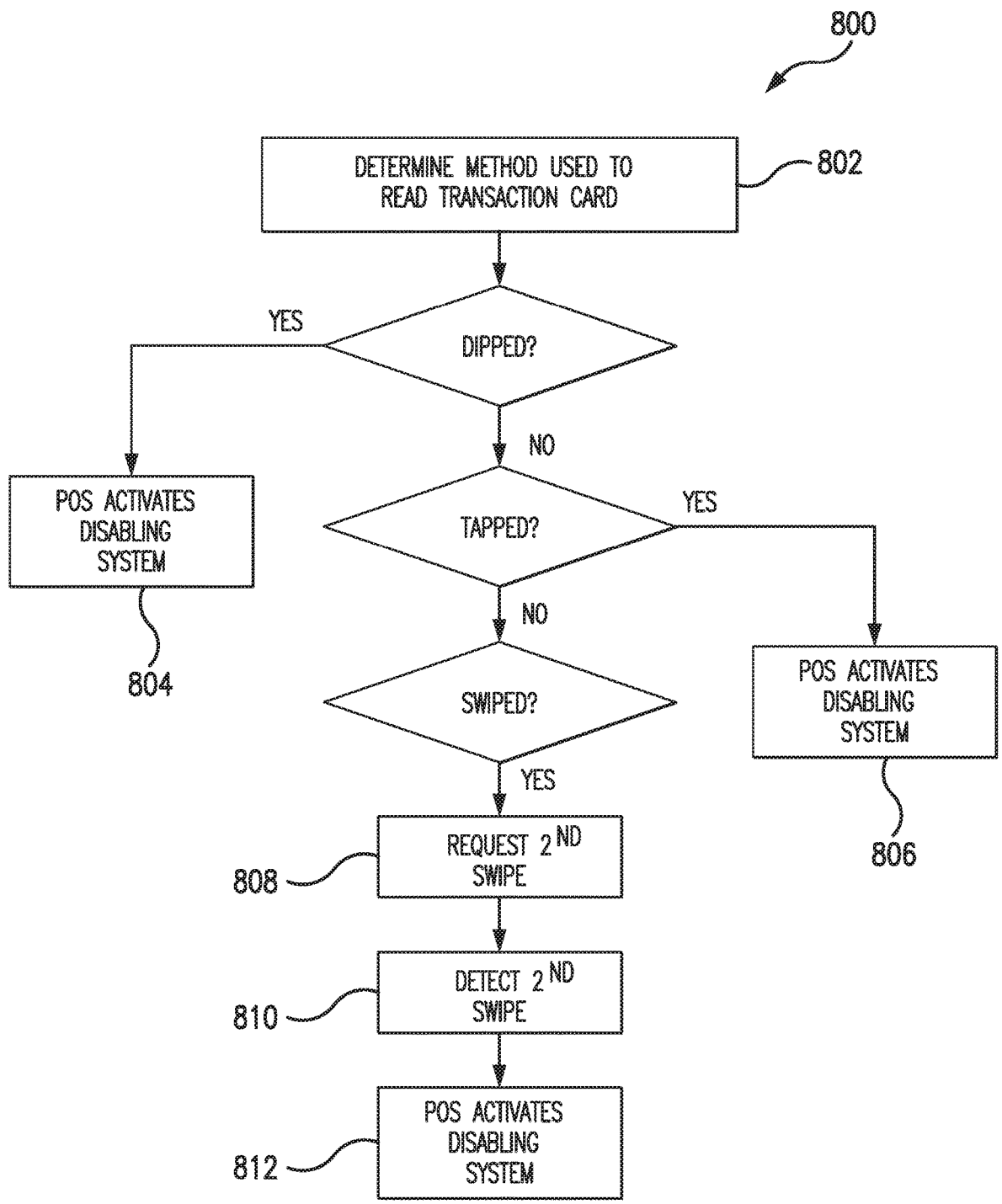
FIG. 8 is a flowchart illustrating another exemplary computer-implemented method for disabling the payment function of a transaction card, in accordance with one embodiment of the present disclosure.

FIG. 8 is a flowchart illustrating an exemplary computer-implemented method 800 for disabling the payment function of a transaction card, in accordance with one embodiment of the present disclosure. The operations described herein may be performed in the order shown in FIG. 8 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 800 is described below, for ease of reference, as being executed by exemplary devices and components introduced with the embodiments illustrated in FIGS. 1-6. In one embodiment, the computer-implemented method 800 is implemented by the disabling system 536 of the merchant POS terminal 500 (each shown in FIG. 5). In the exemplary embodiment, the computer-implemented method 800 relates to disabling the payment function of a transaction card, such as the transaction card 24 (shown in FIG. 2). While operations within the computer-implemented method 800 are described below regarding the disabling system 536, according to some aspects of the present invention, the computer-implemented method 700 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

Upon activation, as described above at operation 718, the disabling system 536 performs the method 800, which includes, at operation 802 determining the method used by the POS terminal 32 to read the payment account data 214 from the transaction card 24. For example, as described herein, the transaction card 24 can be swiped, dipped, tapped, or otherwise operably coupled to the POS terminal 32 to perform a transaction.

If the transaction card 24 was dipped at the POS terminal 32, at operation 804, the disabling system 536 activates one or more of the disabling components 528 configured to disable the payment function of the micromodule 42. For example, and without limitation, an administrator of the POS terminal 32 can set the disabling system 536 to perform a predetermined disabling process (e.g., electronic or physical process) to disable the micromodule 42 of the transaction card 24. The predetermined disabling process performed by a disabling component 528 includes, for example, punching a hole through the micromodule 42 via a punching device, short-circuiting the micromodule 42 via an electrical circuit component, cutting or shredding the micromodule 42 using a cutting device, and/or instructing the processor 502 to erase and/or overwrite the transaction data stored on the transaction card 24. In certain embodiments, if the transaction card 24 was removed from the POS terminal 32 before the disabling process was performed or completed, the POS terminal 32 may present a request (e.g., via the display 510 (shown in FIG. 5)) to the user of the transaction card 24 to insert the transaction card 24 at the POS terminal 32 a second time. Upon the second insertion of the transaction card 24, the disabling process may be initiated to disable the micromodule 42 of the transaction card 24. The request may be substantially similar to the current request perform during a "torn" transaction (i.e., where the cardholder removes the transaction card from the POS card reader before the transaction has been completed).

Similarly, if the transaction card 24 was tapped at the POS terminal 32, at operation 806, the disabling system 536 activates a disabling component 528 configured to disable the payment function of the micromodule 42. For the micromodule 42 being tapped, the disabling process performed by a disabling component 528 includes, at least, instructing the processor 502 to erase and/or overwrite the transaction data stored on the transaction card 24. In certain embodiments, if the transaction card 24 was removed from the POS terminal 32 before the disabling process was performed or completed, the POS terminal 32 may present a request (e.g., via the display 510 (shown in FIG. 5)) to the user of the transaction card 24 to tap or wave the transaction card 24 at the POS terminal 32 a second time. Upon the second wireless connection with the transaction card 24, the disabling process may be initiated to disable the micromodule 42 of the transaction card 24. As described above, the request may be substantially similar to the current request perform during a "torn" transaction.

If the transaction card 24 was swiped at the POS terminal 32, at operation 808, the POS terminal 32 presents a request (e.g., via the display 510 (shown in FIG. 5)) to the user of the transaction card 24 to swipe the transaction card 24 at the POS terminal 32 a second time. At operation 810, the disabling system 536 detects the second swipe of the transaction card 24, for example, via the magnetic stripe reader/writer 512 (shown in FIG. 5). During the second swipe, the disabling system 536 activates, at operation 812, one or more of the disabling components 528 configured to disable the payment function of the magnetic stripe 48 (shown in FIG. 4). An administrator of the POS terminal 32 can set the disabling system 536 to perform a predetermined disabling process (e.g., electronic or physical process) to disable the magnetic stripe 48 of the transaction card 24. The predetermined disabling process performed by a disabling component 528 includes, for example, punching a hole through the magnetic stripe 48 via a punching device, positioning a magnet adjacent the magnetic stripe 48 during the second swipe to erase any data stored thereon, cutting or shredding the magnetic stripe 48 using a cutting device, and/or instructing the processor 502 to erase and/or overwrite the transaction data stored on the magnetic stripe 48 using, for example, the magnetic stripe reader/writer 512.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A computer-implemented method for disabling a payment function of a transaction card, said method performed by a point-of-sale (POS) terminal that includes a disabling component, said method comprising the operations of:
   receiving payment account data from a transaction card;
   transmitting a payment authorization request message to a card issuer associated with the transaction card;
   receiving an authorization request response message from the card issuer, the authorization request response message declining the transaction and including a status response code corresponding to a status of the transaction card;
      determining that the status response code indicates the transaction card is to be captured; and
      based on the determination, physically disabling the payment function of the transaction card by activating the disabling component, the disabling component comprising one or more of the following: a punching device, a cutting device, and an electrical circuit component,
   said operation of activating the disabling component comprising one or more of the follo wing: punching a hole through a magnetic stripe formed on the transaction card using the punching device;
   short-circuiting a micromodule embedded in the transaction card using the electrical circuit component; and cutting or shredding one of the magnetic stripe and the micromodule using the cutting device.

2. The computer-implemented method in accordance with claim said operation of receiving the payment account data from a transaction card comprising reading one of the magnetic stripe formed on the transaction card and the micromodule embedded in the transaction card.

3. The computer-implemented method in accordance with claim 1, said operation of physically disabling the payment function of the transaction card comprising: determining a method used for receiving the payment account data from the transaction card, the method comprising one of the following: reading the magnetic stripe formed on the transaction card with a magnetic stripe reader/writer; reading the micromodule embedded in the transaction card via a physical connection with a chip reader; and reading the micromodule via wireless communication with a transceiver; and activating, based on the determined method, the disabling component transaction.

4. The computer-implemented method in accordance with claim 1, said operation of receiving the payment account data from a transaction card comprising reading the magnetic stripe formed on the transaction card,
   said operation of physically disabling the payment function of the transaction card comprising:
   presenting a request to a user of the transaction card to swipe the transaction card a second time;
   detecting a second swipe of the transaction card, via a magnetic stripe reader/writer; and
   activating the disabling component to disable the payment function of the magnetic stripe.

5. The computer-implemented method in accordance with claim 1, further comprising: determining whether a cardholder selected to receive a notification message corresponding to a declined transaction; generating a notification message if, based on the determination, the cardholder selected to receive the notification message; and transmitting the notification message to the cardholder.

6. The computer-implemented method in accordance with claim 5, said operation of determining whether the cardholder selected to receive the notification message comprising: retrieving the account event notification data for the cardholder from a database; and analyzing the account event notification data to determine whether the account event notification data indicates that the cardholder selected to receive the notification message.

7. The computer-implemented method in accordance with claim 5, said operation of generating the notification message comprises formatting the notification message in a format that can be received by a cardholder mobile device.

8. The computer-implemented method in accordance with claim 7, said operation of transmitting the notification message to the cardholder comprises transmitting the notification message to the cardholder mobile device using a preferred method of delivery selected by the cardholder.

9. The computer-implemented method in accordance with claim 8, the preferred method of delivery includes one or more of the following: a push notification, an interactive voice response, an instant message, a short message Service message, a voicemail message, an email message, and a web-based application message.

10. The computer-implemented method in accordance with claim 1, the authorization request response message comprising a message type indicator (MTT) 0110 message,
   wherein the status response code is a data element 39 (DE 39) response code including at least one of the following codes: 04, 41, and 43.

11. A point-of-sale terminal for disabling a payment function of a transaction card, said system comprising:
   a disabling system comprising one or more disabling components configured to disable the payment function of the transaction card, said one or more disabling components comprising one er more of the following: a punching device, a cutting device, and an electrical circuit component; and
   a processor coupled to said disabling system, said processor programmed to;
   receive payment account data from a transaction card;

transmit a payment authorization request message to a card issuer associated with the transaction card;

receive an authorization request response message from the card issuer, the authorization request response message declining the transaction and including a status response cede corresponding to a status of the transaction card;

determine that the status response code indicates the transaction card is to be captured; and based on the determination, physically disable the payment function of the transaction card, using said one or more disabling components, by one or more of the following: punching a hole through a magnetic stripe formed on the transaction card using the punching device; short-circuiting a micromodule embedded in the transaction card using the electrical circuit component; and cutting or shredding one of the magnetic stripe and the micromodule using the cutting device.

12. The point-of-sale terminal in accordance with claim 11, as part of the operation of receiving the payment account data from a transaction card, said processor being further programmed to read one of the magnetic stripe formed on the transaction card and the micromodule embedded in the transaction card.

13. The point-of-sale terminal in accordance with claim 11, as part of the operation of physically disabling the payment function of the transaction card, said processor further programmed to: determine a method used for receiving the payment account data from the transaction card, the method comprising one of the following: reading the magnetic stripe formed on the transaction card with a magnetic stripe reader/writer; reading the micromodule embedded in the transaction card via a physical connection with a chip reader; and reading the micromodule via wireless communication with a transceiver; and activate, based on the determined method, said one or more disabling components.

* * * * *